United States Patent [19]
Kim et al.

[11] Patent Number: 5,742,370
[45] Date of Patent: Apr. 21, 1998

[54] FABRICATION METHOD FOR LIQUID CRYSTAL ALIGNMENT LAYER BY MAGNETIC FIELD TREATMENT

[75] Inventors: Chung Yup Kim; Young Chul Kim; Dong Young Kim; Hyun Nam Cho; Jun Young Lee, all of Seoul, Rep. of Korea

[73] Assignee: Korea Institute of Science and Technology, Seoul, Rep. of Korea

[21] Appl. No.: 806,831

[22] Filed: Feb. 26, 1997

[30] Foreign Application Priority Data

Sep. 12, 1996 [KR] Rep. of Korea ............... 39463/1996

[51] Int. Cl.[6] ...................................... G02F 1/337
[52] U.S. Cl. ................................ 349/124; 349/191
[58] Field of Search ...................... 349/94, 124, 191

[56] References Cited

U.S. PATENT DOCUMENTS

| | | | |
|---|---|---|---|
| 4,729,847 | 3/1988 | Miyazawa et al. | 349/184 |
| 4,892,392 | 1/1990 | Broer | 349/124 |

FOREIGN PATENT DOCUMENTS

| | | |
|---|---|---|
| 1-113728 | 5/1989 | Japan . |
| 2-43517 | 2/1990 | Japan . |
| 4-350822 | 12/1992 | Japan . |
| 5-34699 | 2/1993 | Japan . |
| 5-80340 | 4/1993 | Japan . |
| 6-313886 | 11/1994 | Japan . |
| 95-9327 | 4/1995 | Rep. of Korea . |

OTHER PUBLICATIONS

Nissan Chemical Industries, Ltd., "Nissan Alignment Coatings for LCDs," 2 page listing.

John L. Janning "Thin Film Surface Orientation of Liquid Crystals," App. Phys. Letters, vol. 21 (1972), pp. 173–174.

*Primary Examiner*—Anita Pellman Gross
*Attorney, Agent, or Firm*—Reid & Priest L.L.P.

[57] ABSTRACT

A fabrication method for a liquid crystal alignment layer which has an excellent liquid crystal orientation efficiency and stability, and which can be mass-produced includes coating a thermoplastic polymer film on a transparent electrode to have a thickness of not less than 500Å, fabricating a temporary cell with a structure of transparent electrode (ITO glass) / polymer film / liquid crystal / polymer film / transparent electrode (ITO glass) by attaching two transparent electrodes having polymer films coated thereon and infusing liquid crystal, fabricating a stack with a structure of transparent electrode (ITO glass)/polymer film /liquid crystal by contacting liquid crystal on the polymer film, heating the temporary cell or the stack at lower than phase separation temperature of a blend of liquid crystal and the polymer film, while applying a magnetic field exceeding 0.2 tesla, and cooling the temporary cell or the stack in the magnetic field at a cooling rate of not more than 100° C. per minute.

2 Claims, 4 Drawing Sheets

FABRICATION METHOD FOR LIQUID CRYSTAL ALIGNMENT LAYER BY MAGNETIC FIELD TREATMENT

BACKGROUND OF THE INVENTION

1. Field of the Invention

The present invention relates to a fabrication method for a liquid crystal alignment layer which is a polymer film used for aligning liquid crystal in a certain direction, and more particularly, to a method for forming a liquid crystal alignment layer by giving an anisotropy to the polymer film surface at a liquid crystal-polymer interface, by using a magnetic field.

2. Description of the Prior Art

A twisted nematic, supertwisted nematic or ferroelectric liquid crystal display (hereinafter, called TN-LCD, STN-LCD, and FLCD, respectively) presently being fabricated for commercial purposes have a configuration of a sandwich cell in which liquid crystal is filled between two transparent electrodes (ITO glass), and uses the characteristic that a light transmittance is varied on passing through polarizer films attached at both sides of a cell when an orientation direction of liquid crystal molecules changes in accordance with an application of an electric field. Here, the role of a liquid crystal alignment layer is to align liquid crystal molecules in a predetermined direction on the alignment layer when an electric field is not applied and to maximize a contrast ratio of a light transmittance when an electric field is applied. The polymer used commercially is polyimide (hereinafter, called PI).

A general formation process of a PI liquid crystal alignment layer will now be described.

A solution in which a polyimide precursor is dissolved is applied on ITO glass, and cured for fifteen minutes at temperature of 80° C. Then, a post-curing is carried out for sixty minutes at a temperature of 170°~250° C. (reference to technical data sheet of Nissan SE-series alignment coatings for LCDs). Therefore, much energy and time is consumed in this process. Further, the alignment layer can achieve an ability of aligning liquid crystal through a process of a mechanical rubbing or buffing by a rotating drum on which cloth made of nylon or cotton is wound after the curing process of the precursor. During the rubbing (or buffing) process, the ITO electrode patterned in a micronized shape or a thin film transistor layer of an active matrix LCD is occasionally destroyed by static charge accumulated on the surface of the alignment layer, which increases a malfunction rate of a completed display panel fabricated.

To solve the above problem, liquid crystal can be aligned by oblique evaporation (Appl. Phys. Lett, 21, p173,1972) of a dielectric material such as silicon oxide on ITO glass plates, but this method is not economical, and is difficult to obtain a low pre-tilt angle of below three degrees which is mainly adopted in TN-LCDs Moreover, there are many methods suggested for solving the above problems as follows;

The method of exposing a polymeric material such as a polyvinylcinnamate derivative having photoreactive characteristics to polarized ultraviolet light (Korean laid-open patent publication No. 95-009327 and Japanese laid-open patent publication No. 05-034699), the method of photopolymerizing a liquid crystalline monomer under an electric or magnetic field (Japanese laid-open publication No. 01-113728), the method of passing a Langmuir-Blodgett (LB) film through an electric or magnetic field after forming the LB film and the method of heating and orienting a side-chain or main-chain liquid crystalline polymer (Japanese laid-open publication No. 06-313886 and 02-043517). However, the above-described methods are difficult to commercialize because the efficiency of the methods are not so excellent due to a low orientation effect and stability, or the process or the equipment is complicated and a high magnetic field is required.

SUMMARY OF THE INVENTION

Accordingly, it is an object of the present invention to provide an improved fabrication method for an alignment layer which can be mass-produced and has excellent efficiency and stability of a liquid crystal orientation.

To achieve the above object, there is provided an improved fabrication method for a liquid crystal alignment layer which includes coating a thermoplastic polymer film on a transparent electrode to have a thickness of 500 Å or more, fabricating a temporary cell having a structure of transparent electrode (ITO glass) / polymer film / liquid crystal / polymer film / transparent electrode (ITO glass) by attaching two transparent electrodes on which the polymer film is coated and infusing liquid crystal therebetween, or fabricating a stack having a structure of transparent electrode (ITO glass) / polymer film / liquid crystal by contacting liquid crystal on the polymer film, heating the temporary cell or the stack at lower than the phase separation temperature of a blend of the liquid crystal and the polymer while applying a magnetic field of over 0.2 tesla, and then cooling the temporary cell or the stack in the magnetic field to room temperature at a cooling rate of below 100° C. per minute.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION OF THE PREFERRED EMBODIMENTS

Figure 1:
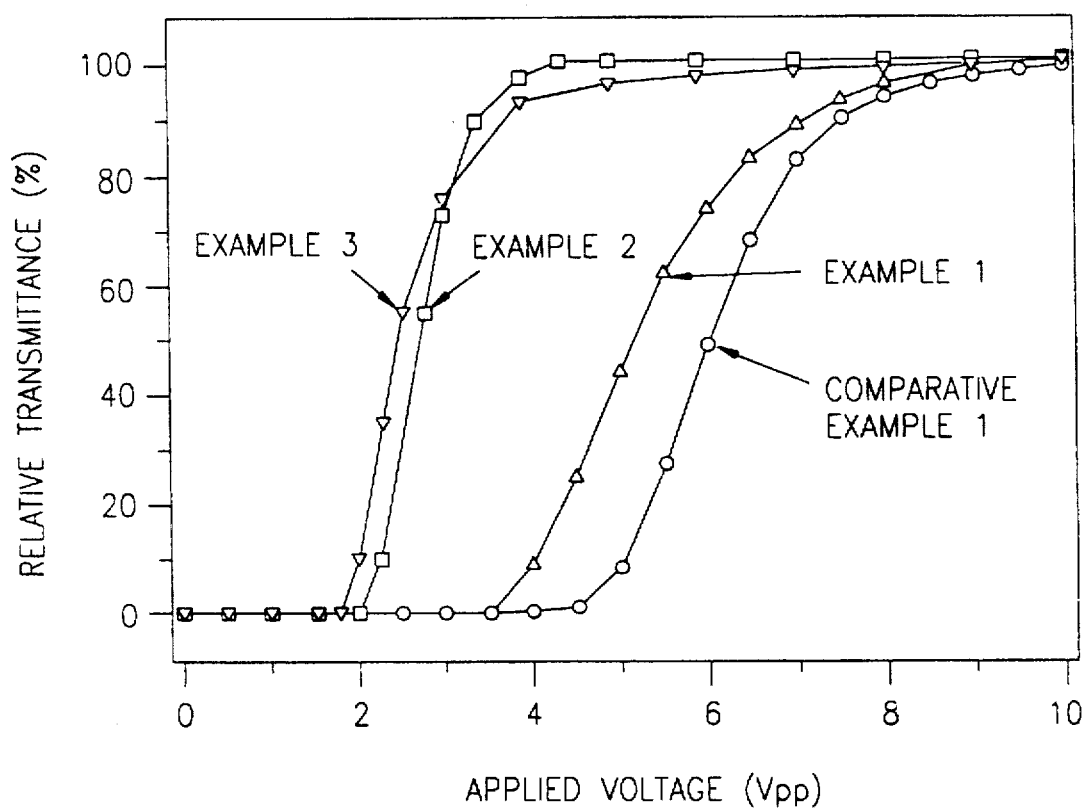
FIG. 1 is a graph showing a change of relative transmittance according to a voltage increase when a 100 Hz rectangular wave is applied to an E63 TN-LCD cell.

Of the non-rubbing liquid crystal alignment layer fabrication methods, in the conventional fabrication methods using magnetic fields, after a reactive liquid crystalline monomer or precursor is oriented in a magnetic field, a chemical reaction is performed, or a liquid crystalline polymer layer is oriented by a magnetic field to have a function as a liquid crystal alignment layer in order to fix the orientation in a magnetic field. However, in the present invention, a chemical reaction under a magnetic field is not required. Low molecular-weight liquid crystal under the magnetic field generates a liquid crystalline orientation function on the surface of the thermoplastic polymer film which is in contact with the low molecular-weight liquid crystal layer.

In the present invention, a polymer film to be used as a liquid crystal alignment layer is formed by spin-casting a solution of an amorphous or low-crystallinity thermoplastic polymer dissolved in an appropriate solvent onto ITO glass, contacting single-component liquid crystal or mixed-type liquid crystal thereon, heating at a predetermined temperature according to the thermal characteristics of the polymer in the magnetic field, and then cooling the resultant in the field, to obtain the desired liquid crystal alignment layer. Here, the liquid crystal oriented by the magnetic field introduces anisotropy to the polymer film surface by forcing polymer surface molecules to align along the oriented liquid crystal molecules. The surface molecules freeze on colling the stack to room temperature and in return has the effect of aligning liquid crystal in a fixed direction without a magnetic or electric force to achieve a memory effect, and the use of such effect is the characteristic of the present invention.

Materials such as polyvinylformal, polyvinylbutylal, acrylic polymers, polystyrene, styrene-acrylonitrile copolymer (SAN), poly(ethylene terephthalate), polycarbonate, amorphous nylon or silicon polymers which are polymeric materials that are amorphous or have crystallinity below 5% to be transparent and have glass transition temperature of below 200° C. are appropriate for a transparent film material to be used as the liquid crystal alignment layer.

By controlling the concentration of the polymer solution to be 0.1~0.2 weight percent and the rotating speed in spin-casting to be 100~5,000rpm, the formed polymer alignment layer must be controlled to have a thickness of 500 Å or higher.

Also, if the remaining solvent in the spin-cast film is dried in vacuum or at temperature of 100° C. for 5 to 60 minutes, the stability of the liquid crystal alignment layer can be improved, if necessary.

The method of contacting a polymer film with liquid crystal for the magnetic field treatment is as follows:

Spacers such as polymer film strips, glass beads or glass fibers having a thickness of 1~25 μm are inserted between two ITO glass plates coated with a polymer film which are then attached, and then the liquid crystal is infused into the space therebetween to complete a temporary cell with the structure of transparent electrode(ITO glass) / polymer film / liquid crystal / polymer film / transparent electrode(ITO glass). When such temporary cell is used, one set of liquid crystal alignment layers can be fabricated at the same time.

Or, a stack in which a transparent electrode, a polymer film and a liquid crystal layer are sequentially stacked, that is, transparent electrode (ITO glass) / polymer film / liquid crystal can be employed, wherein liquid crystal is deposited to have a thickness of not more than 2 μm on the polymer film on the ITO glass coated by a spin-casting, roll coating or spray coating method. Further, after the ITO glass coated with a polymer film is heated above the isotropic transition temperature of the liquid crystal, the liquid crystal can be spin-coated thereon.

The temporary cell or the stack fabricated according to the above-described method is put in a magnetic field of over 0.2 tesla, and is heated to a set temperature using a heater or a laser manufactured with materials not influenced by a magnetic field. Here, when the intensity of the magnetic field is below 0.2 tesla, the orientation characteristics of the liquid crystal alignment layer is drastically decreased.

The phase separation temperature of aligned of liquid crystal and a polymer i.e., the temperature required to change from a two-phase state of the blend to a single phase state, otherwise known as the upper critical solution temperature (UCST), is used as the set temperature of the present invention. The reason is that when a temporary cell or a stack is heated above the phase separation temperature, the liquid crystal and the polymer film form into a single phase and the phase is separated into two after being cooled at room temperature to generate a liquid crystal alignment layer with a very irregular surface.

After the temporary cell or the stack is heated at the set temperature, it is cooled down at the rate of not more than 100° C./min to temperature that is higher than 50° C. and lower than the glass transition temperature of the polymer. Then the cell or the stack is pulled out of the magnetic field. When the temporary cell or the stack is heated at the set temperature and then cooled under the magnetic field, the liquid crystal molecules constitute a nematic liquid crystal phase, and are oriented in the direction parallel to the magnetic field, which gives an orientation effect to the boundary film surface, so that the polymer film achieves the function of orienting the liquid crystals. Here, if the cooling rate is very rapid whereby it exceeds 100° C./min, the liquid crystal orientation can not be uniform onto the surface of the polymer film to result in a poor liquid crystal alignment layer.

The temporary cell treated in the magnetic field is put between two polarizer plates having polarizing directions which are perpendicular to each other, and the temporary cell is rotated on the surface to observe the change of a light transmittance, and as a result, the maximum value of the transmittance is observed when the angle made of the direction generated on the cell by the magnetic field and the polarizing direction of either of the polarizer plates is, respectively 45, 135, 225, and 315 degrees. It can be seen that liquid crystal molecules in the temporary cell are all oriented in the direction in which the magnetic field was applied so that the temporary cell itself can be used as a polarized light-detecting device through which only the polarized light parallel to the liquid crystal orientation passes.

When the temporary cell or the stack is treated in the magnetic field, since tens of or hundreds of the cells or stacks can be treated at the same time depending on the size of the space under the force of a magnetic field, a mass production of the liquid crystal alignment layer can be achieved.

If an LCD is fabricated with the alignment layers formed according to the above-described method, when an electric field is applied thereto, liquid crystal is oriented in the direction parallel to the applied electric field, and when the electric field is removed, the liquid crystal returns to its original direction, and such process can be repeatedly performed.

When the liquid crystal alignment layers are produced using a temporary cell, the temporary cell is disassembled to obtain two transparent electrodes with the layers, and having the film, glass bead or glass fiber spacers placed therebetween, these electrodes are attached and sealed together in such a manner that the liquid crystal orientation angle of the two alignment layers is 90° or greater, resulting in the formation of a TN-LCD cell or an STN-LCD cell. Here, so as to prevent a generation of bubbles in the cell, the attachment of the electrodes is to be carried out by filling a suitable amount of liquid crystal in the void of the cell.

When the liquid crystal alignment layers are produced using the stack treated in the magnetic field, with the film, glass bead, or glass fiber spacers placed therebetween, two electrodes with the alignment layer are attached and sealed in such a manner that the liquid crystal orientation angle is formed to be 90° C. on the two alignment layers, resulting in completion of the fabrication of the TN-LCD cell or STN-LCD cell.

To evaluate the performance of the liquid crystal alignment layer produced according to the present invention, a TN-LCD cell which is 5.6 μm thick and 1×2 cm² wide was fabricated using a poly(ethylene terephthalate) film spacer and sealed with epoxy resin. Both surfaces of the TN-LCD cell are attached with two polarizer films, the polarizing direction of which is parallel with each other so that the cell is operated in a dark mode to measure the electro-optic characteristic. When a peak-to-peak voltage (Vpp) of the electric field with a rectangular wave of 100 Hz is applied to both ends of the cell, the change of a relative transmittance of the TN-LCD cell with the applied potential was measured to evaluate the characteristic of the liquid crystal alignment layer produced by each method. Each electro-optic response pattern is obtained at each voltage to measure a time ($t_{on}$) required when relative transmittance is increased to 90% of the maximum transmittance from the zero point prior to an application of the electric field, a time ($t_{off}$) required when relative transmittance is decreased to 10% from the maximum transmittance point when the electric field is removed, and the total response time ($t_{tot}=t_{on}+t_{off}$). The above-test result was compared with the result obtained from a TN-LCD which has the same liquid crystal and configuration in which the rubbed PI alignment layer is used.

As described above, the present invention suggests a new method capable of mass-producing liquid crystal alignment layers by the simple process, and it can be seen that the electro-optic response efficiency of the liquid crystal display device manufactured by using the alignment layers having an excellent liquid crystal orientation performance is outstanding. With reference to the examples, the present invention will now be described in detail. However, descriptions of these examples are not given to limit the present invention.

EXAMPLE 1

Polyvinylformal was dissolved in chloroform to obtain one weight % of the solution, which was spin-cast on ITO glass of 2×3 cm² at a spinning speed of 1500 rpm, and dried for 30 minutes in a convection oven maintaining temperature of 100° C. Thickness of the polyvinylformal film on the ITO glass measured with a depth profiler was 3,300±100 Å, and surface roughness of the film measured by an atomic force microscope was about 100 Å. Two pieces of ITO glass coated with the polyvinylformal and a 5.6 μm thick poly(ethylene terephthalate) film spacer were used to form an empty cell, to be filled with nematic liquid crystal(E63, BDH) by a capillarity action, for being treated in a magnetic field whereby only the four edge portions were fixed with epoxy resin. An aluminum heating block with a temperature controller was placed in a 2 tesla magnetic field and temperature was set at 80° C., the temporary cell was placed thereon for five minutes, cooled at a rate of 5° C. per minute until 30° C. is reached and pulled out of the magnetic field.

After the temporary cell treated in the magnetic field was cooled to room temperature, it was put between two pieces of polarizer plates on which the polarizing directions were perpendicular to each other. The temporary cell was rotated on the face to observe changes in the light transmittance, and as a result, liquid crystal molecules in the cell were oriented in the direction of the magnetic field and orientational defects were not found when cell was observed with a polarized microscope.

Figure 2:
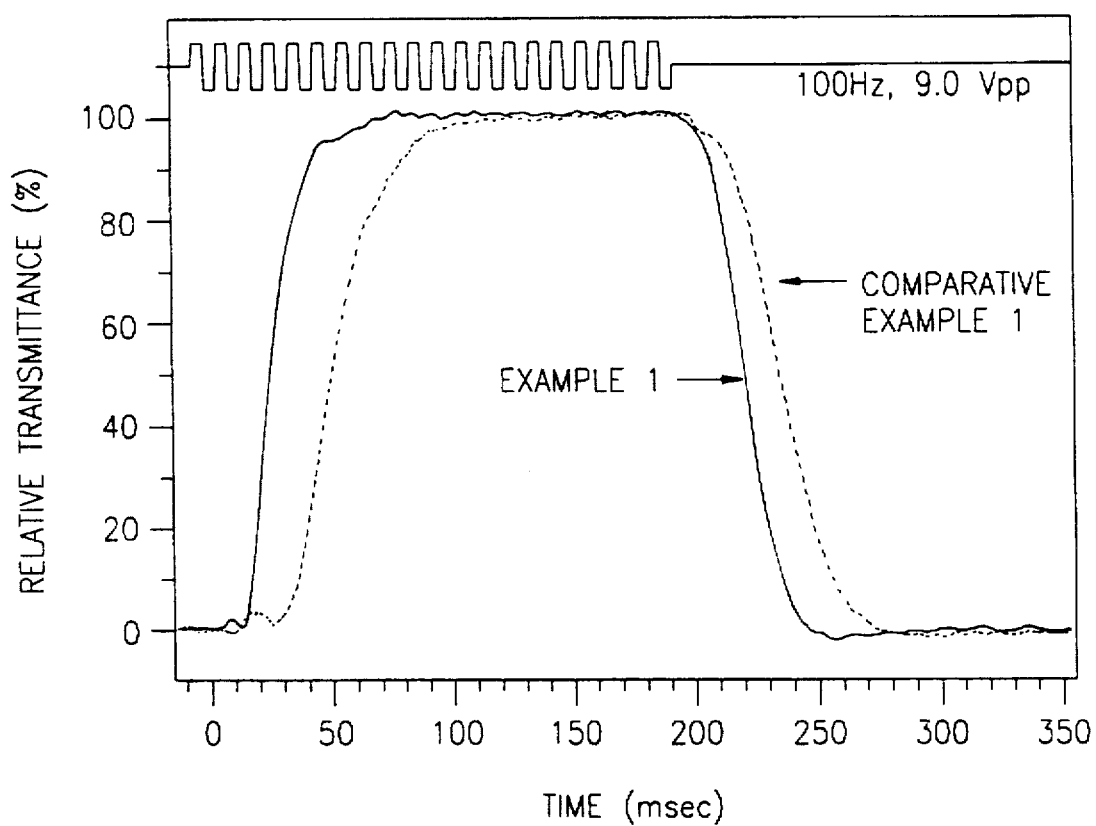
FIG. 2 is an electro-optic response pattern obtained from a repeated operation of applying $9.0V_{pp}$–100 Hz of a rectangular wave to an E63 TN-LCD cell for 0.2 seconds and removing the same for 0.2 seconds.
Figure 3:
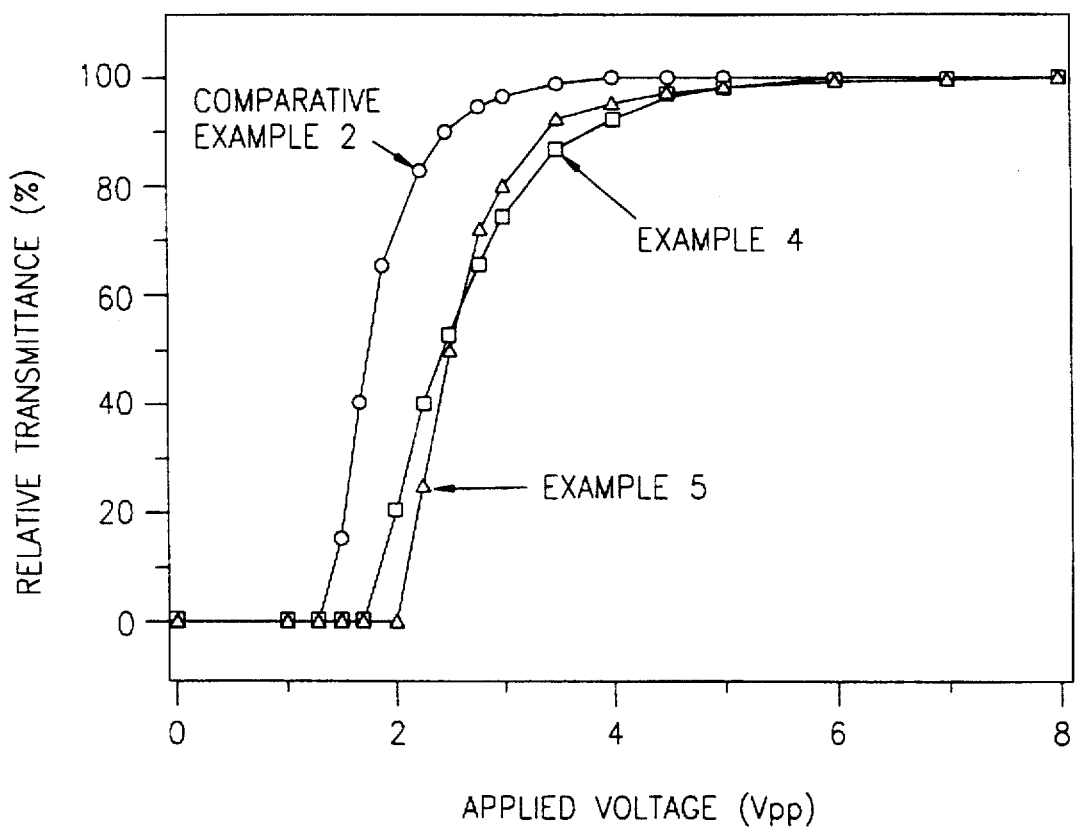
FIG. 3 is a graph showing a change of relative transmittance according to a voltage increase when a 100 Hz rectangular wave is applied to a ZLI-2293 TN-LCD cell.

The temporary cell is disassembled to obtain two pieces of ITO glass with alignment layers, and the two TIO glass plates are attached in an intersecting direction with a 5.6 μm poly(ethyleneterephthate) film spacer placed therebetween, and then sealed with epoxy resin to fabricate a TN-LCD cell. FIG. 1 shows changes of relative transmittance with respect to an increase of applied voltage when the TN-LCD cell is positioned between two pieces of polarizer plates of which the polarizing directions are parallel with each other so as to operate in a dark mode and a rectangular wave of 100 Hz is applied to the cell. FIG. 2 shows an electro-optic response pattern obtained at the saturation voltage of 9.0 Vpp. Table 1 shows electro-optic response times measured from FIG. 2 indicating that the total response time ($t_{tot}$) is shorter than that of the TN-LCD cell using a PI liquid crystal alignment layer.

COMPARATIVE EXAMPLE 1

A fabrication method for a TN-LCD cell and a measurement method of an electro-optic response characteristic are identical to those of the Example 1, but in this example, a PI film (SE3140, Nissan Chemical Industry) that was rubbed mechanically and not treated in a magnetic field was used as the liquid crystal alignment layer.

EXAMPLE 2

All conditions of the experiment were the same as those of Example 1, except that the heating block in the magnetic field was maintained at constant temperature of 100° C., the temporary cell was placed thereon for five minutes, and cooled to 30° C. at a rate of 5° C. per minute to form an alignment layer.

EXAMPLE 3

All conditions of the experiment were the same as in Example 1, except that the heating block in the magnetic field was maintained at constant temperature of 120° C., the temporary cell was placed thereon for five minutes, and cooled to 30° C. at a rate of 5° C. per minute to form an alignment layer.

TABLE 1

| Electro-optic response times of E63 TN-LCD cells | | | | |
|---|---|---|---|---|
| | *AV (Vpp) | $t_{on}$ (msec) | $t_{off}$ (msec) | $t_{tot}$ (msec) |
| Example 1 | 9.0 | 39 | 42 | 81 |
| Example 2 | 5.0 | 45 | 55 | 100 |
| Example 3 | 5.0 | 114 | 178 | 292 |
| Comparative Example 1 | 9.0 | 73 | 63 | 136 |

*AV: applied voltage

EXAMPLE 4

Figure 4:
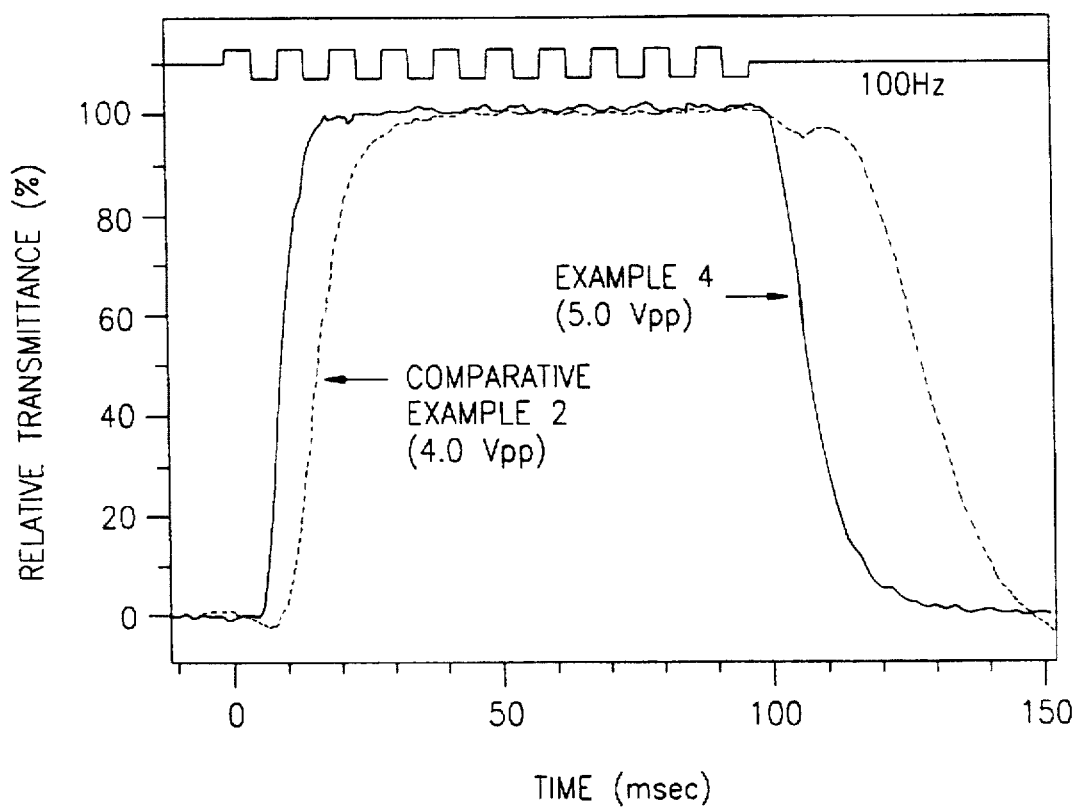
FIG. 4 is an electro-optic response pattern obtained from a repeated operation of applying a 100 Hz rectangular wave to a ZLI-2293 TN-LCD cell for 0.1 seconds and removing the same for 0.1 seconds.

All conditions of the experiment were the same as those of Example 1, but ZLI-2293 from Merck was used as the nematic liquid crystal. The heating block in the magnetic field was maintained at constant temperature of 120° C., the temporary cell was placed thereon for five minutes, and cooled to 30° C. at the rate of 5° C. per minute to form an alignment layer. respect to an increase of an applied voltage, and FIG. 4 shows an electro-optic response pattern obtained at the saturation voltage of 5.0 Vpp. Table 1 shows electro-optic response times measured from FIG. 4 indicating that the total response time ($t_{tot}$) is shorter than that of the TN-LCD cell using a PI liquid crystal alignment layer.

COMPARATIVE EXAMPLE 2

A fabrication method for a TN-LCD cell and a measurement method of an electro-optic response characteristic are identical to those of Example 4, but in this example, a PI film (SE3140, Nissan Chemical Industry) rubbed mechanically but not treated in a magnetic field was used as a liquid crystal alignment layer. FIG. 4 shows an electro-optic response pattern obtained at a saturation voltage of 4.0 Vpp.

EXAMPLE 5

All conditions of the experiment were the same as those of Example 1, but ZLI-2239 from Merck was used as the nematic liquid crystal. While the heating block in the magnetic field was maintained at constant temperature of 120° C., the temporary cell was placed thereon for five minutes, and cooled to 30° C. at a rate of 5° C. per minute to form an alignment layer. at a rate of 5° C. per minute to form an alignment layer.

TABLE 2

Electro-optic response times of ZLI-2293 TN-LCD cells

| | *AV (Vpp) | $t_{on}$ (msec) | $t_{off}$ (msec) | $t_{tot}$ (msec) |
|---|---|---|---|---|
| Example 4 | 5.0 | 15 | 19 | 34 |
| Example 5 | 5.0 | 44 | 73 | 117 |
| Comparative Example 2 | 4.0 | 24 | 42 | 66 |

*AV: applied voltage

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A fabrication method for a liquid crystal alignment layer, comprising:

coating a polymer film on a transparent electrode to have a thickness of not less than 500 Å;

fabricating a temporary cell with a structure of transparent electrode (ITO glass) / polymer film / liquid crystal / polymer film / transparent electrode (ITO glass) by attaching two transparent electrodes having a polymer film coated thereon and infusing a liquid crystal therebetween, or fabricating a stack with a structure of transparent electrode (ITO glass) /polymer film / liquid crystal by contacting liquid crystal on the polymer film;

heating the temporary cell or the stack at lower than phase separation temperature of a blend of liquid crystal and the polymer film while applying a magnetic field stronger than 0.2 tesla; and cooling the temporary cell or the stack in the magnetic field at a cooling rate of not more than 100° C. per minute.

2. The method of claim 1, wherein polyvinylformal, polyvinylbutylal, acrylic polymers, polystyrene, styrene-acrylonitrile copolymer (SAN), poly(ethylene terephthalate), polycarbonate, amorphous nylon or silicon polymer is used as the thermoplastic polymer.

* * * * *